(12) United States Patent
Moro et al.

(10) Patent No.: US 7,148,807 B2
(45) Date of Patent: Dec. 12, 2006

(54) INFORMATION TRANSMISSION SYSTEM AND INFORMATION TRANSMISSION APPARATUS

(75) Inventors: Eiji Moro, Hitachinaka (JP); Shigehisa Rokuta, Mito (JP); Kazuo Shigematsu, Yoshikawa (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 10/837,427

(22) Filed: Apr. 30, 2004

(65) Prior Publication Data

US 2005/0040959 A1 Feb. 24, 2005

(30) Foreign Application Priority Data

Aug. 12, 2003 (JP) ............................. 2003-207251

(51) Int. Cl.
*G08B 21/00* (2006.01)
(52) U.S. Cl. .................. 340/636.1; 455/572; 455/573; 455/343.1; 455/343.2; 455/343.3; 455/343.4; 455/343.5
(58) Field of Classification Search ............. 340/636.1, 340/636.21, 572, 573, 343.1, 343.2, 343.3, 340/343.4, 343.5, 405, 425, 67.11; 455/405, 455/425, 343.1, 343.2, 343.3, 343.4, 343.5, 455/572, 573, 574, 67.11
See application file for complete search history.

(56) References Cited

U.S. PATENT DOCUMENTS 5,497,507 A * 3/1996 Komaki .................. 455/552.1
6,236,326 B1 * 5/2001 Murphy .................... 340/636.1
6,263,200 B1 * 7/2001 Fujimoto ................... 455/343.5
6,295,002 B1 * 9/2001 Fukuda ..................... 340/636.1
6,459,896 B1 * 10/2002 Liebenow ................... 455/425
6,721,580 B1 * 4/2004 Moon ......................... 455/574
6,898,446 B1 * 5/2005 Muto ......................... 455/574
6,963,763 B1 * 11/2005 Cannon et al. ............. 455/573
2002/0132649 A1 * 9/2002 Motohashi .................. 455/572
2004/0204181 A1 * 10/2004 Cromer et al. .............. 455/574

FOREIGN PATENT DOCUMENTS

JP 2003-149317 5/2003

* cited by examiner

Primary Examiner—Jeffery Hofsass
Assistant Examiner—Edny Labbees
(74) Attorney, Agent, or Firm—Townsend and Townsend and Crew LLP

(57) ABSTRACT

When a remaining battery power amount of a child appliance is lowered, a battery recharging operation of the child appliance is not quickly carried out, lowering of the remaining battery power amount of the child appliance is displayed on a mother appliance which is owned by a mother. When there is a risk that the remaining battery power amount of the child appliance is lowered and thus operations of the child appliance will be brought into a malfunction condition, a content of a special instruction is stored into a non-volatile memory employed in the child appliance. Otherwise, while the content of the special instruction has been stored in a management server, an operation may be carried out in response to the instructed response after the remaining battery power amount has been recovered to a sufficiently high battery power amount.

6 Claims, 4 Drawing Sheets

INFORMATION TRANSMISSION SYSTEM AND INFORMATION TRANSMISSION APPARATUS The present application claims priority from Japanese application JP2003-207251 filed on Aug. 12, 2003, the content of which is hereby incorporated by reference into this application.

BACKGROUND OF THE INVENTION

This present invention is related to an information transmission system and an information transmission apparatus.

As an example of the conventional position retrieving system, for instance, such services that GPS position retrieving information and portable telephone networks are utilized have already been available in practical fields, which may function as crime prevention systems (refer to FIG. 1 and pages 3 to 5 of JP-A-2003-149317). In such a crime prevention system, while a mobile appliance is taken by either children or elder persons, in the case that either the children or the elder persons are missing, even if either the children or the elder persons do not operate the mobile appliance, the mobile appliance is automatically initiated by responding to calling instructions from another information transmission apparatus or the like. As a result, the mobile appliance transmits present positional information. Also, in general, remaining battery power amounts when the remaining battery power amounts of mobile appliance are lowered are displayed on display units provided with the relevant mobile appliance.

In the case that mobile appliance is taken by either children or elder persons, even when shortages of the remaining battery power amounts are displayed on display units of the relevant mobile appliance, there are some possibilities that recharging operations are not carried out in proper manners. Also, even when the remaining battery power amounts are lowered, it is desirable that firm communications may be established from the mobile appliance in response to special instructions such as searching requests for missing people.

SUMMARY OF THE INVENTION

To solve the above-described problem, in both an information transmission system and an information transmission apparatus according to the present invention, in such a case that a remaining battery power amount of the mobile appliance (will be referred to as "child appliance" hereinafter) is lowered, lowering of the remaining battery power amount of the child appliance is displayed on such an appliance (will be referred to as "mother appliance" hereinafter) which is owned by a mother or a security firm. Also, in the case that the remaining battery power amount of the child appliance is lowered, a content of a special instruction is stored into a non-volatile memory employed in the child appliance. Otherwise, while the content of the special instruction has been stored in a management server, an operation may be carried out in response to the instructed response after the remaining battery power amount has been recovered to a sufficiently high battery power amount.

Other objects, features and advantages of the invention will become apparent from the following description of the embodiments of the invention taken in conjunction with the accompanying drawings.

DESCRIPTION OF THE EMBODIMENTS

Figure 1:
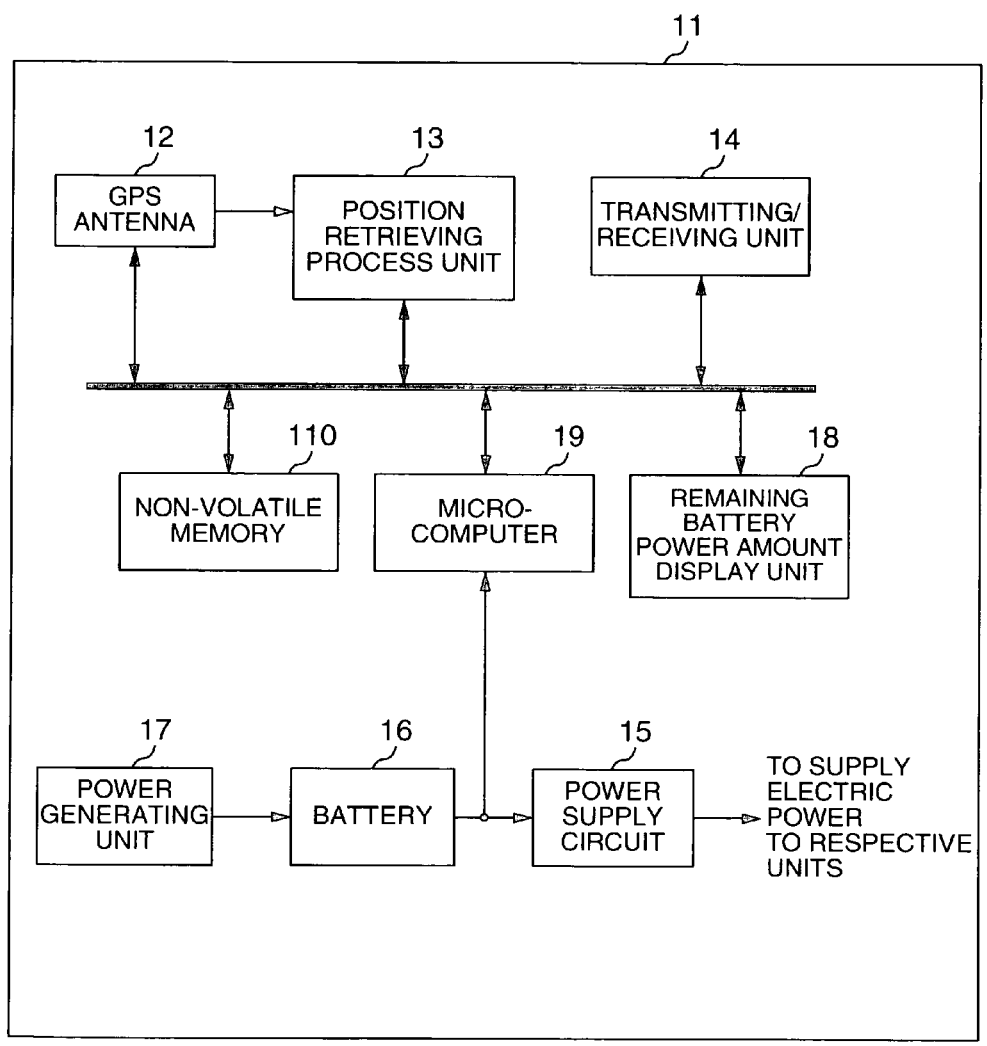
FIG. 1 indicates a block diagram of the child appliance according to an embodiment of the present invention.

Referring now to the drawings, various embodiments of the present invention will be described.

FIG. 1 is a schematic block diagram for indicating an internal arrangement of the child appliance according to an embodiment of the present invention. In the drawings, reference numeral 11 designates an entire arrangement of the child appliance corresponding to the mobile appliance which is taken by a child or an elder person. The child appliance 11 contains as structural elements, a GPS (global positioning system) antenna 12 and a position retrieving process unit 13, which are employed so as to retrieve positions; a transmitting/receiving unit 14 for communicating information with the mother appliance; a power supply circuit 15 and a battery 16, which are employed so as to supply electric power to the respective units of the child appliance 11; a power generating unit 17 for recharging the battery 16; a remaining battery power amount display unit 18 for displaying a remaining battery power amount on the child appliance 11; a microcomputer 19 for controlling the respective units; and also a non-volatile memory 110.

Figure 2:
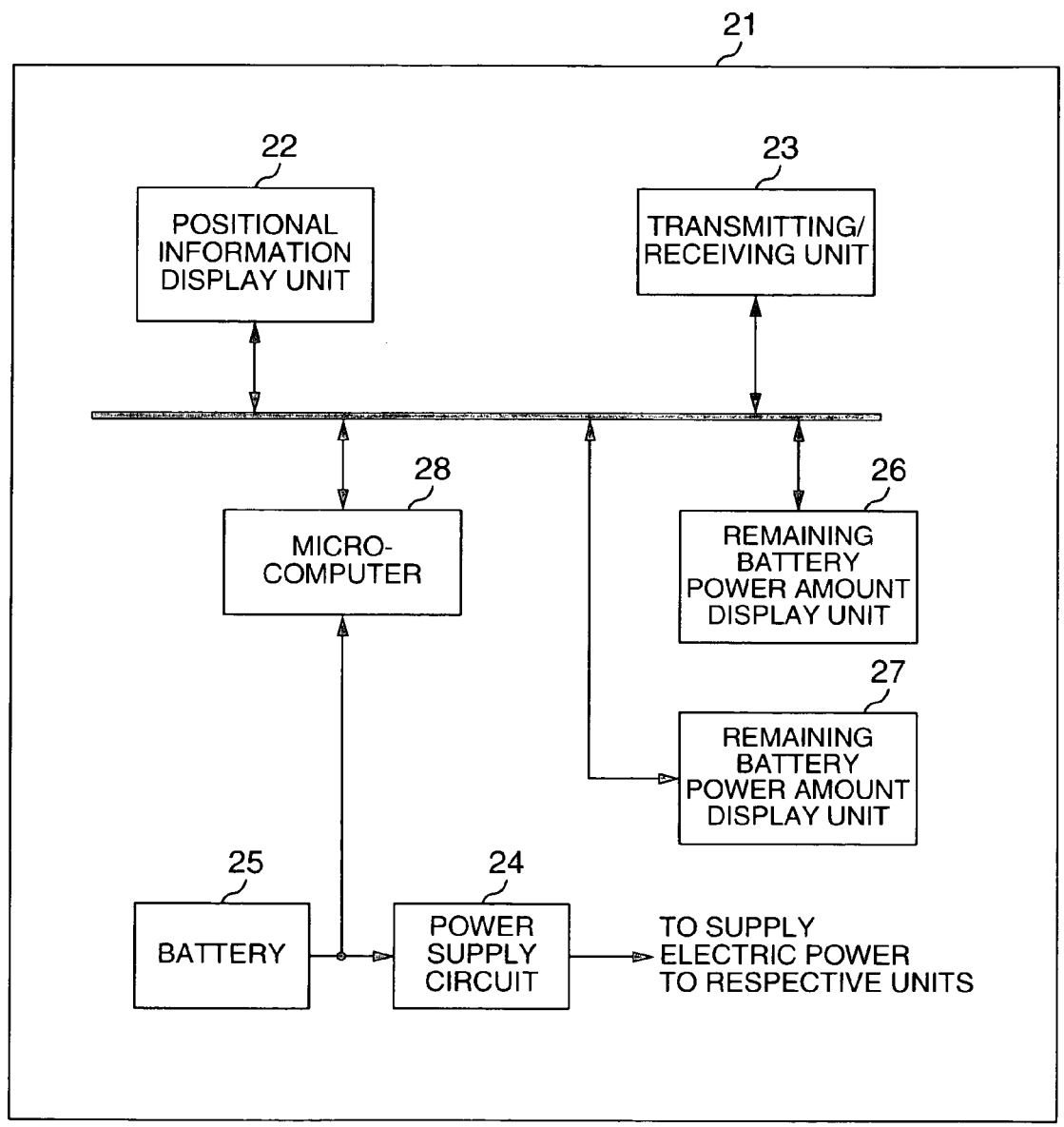
FIG. 2 shows a block diagram of the mother appliance according to an embodiment of the present invention.

FIG. 2 is a schematic block diagram for indicating an internal arrangement of the mother appliance according to an embodiment of the present invention. In the drawings, reference numeral 21 designates an entire arrangement of the mother appliance. The mother appliance 21 contains as structural elements, a positional information displaying unit 22 for displaying a position of the child appliance 11; a transmitting/receiving unit 23 for communicating information with the child appliance 11; a power supply circuit 24 and a battery 25, which are employed so as to supply electric power to the respective units of the mother appliance 21; a remaining battery power amount display unit 26 for displaying a remaining battery power amount of the mother appliance 21; another remaining battery power amount display unit 27 for displaying a remaining battery power amount of the child appliance based upon remaining battery power amount information which is transmitted from the child appliance registered a relationship between the mother appliance and the corresponding child appliance; and also, a microcomputer 28 for controlling the respective units of the mother appliance 21.

Figure 3:
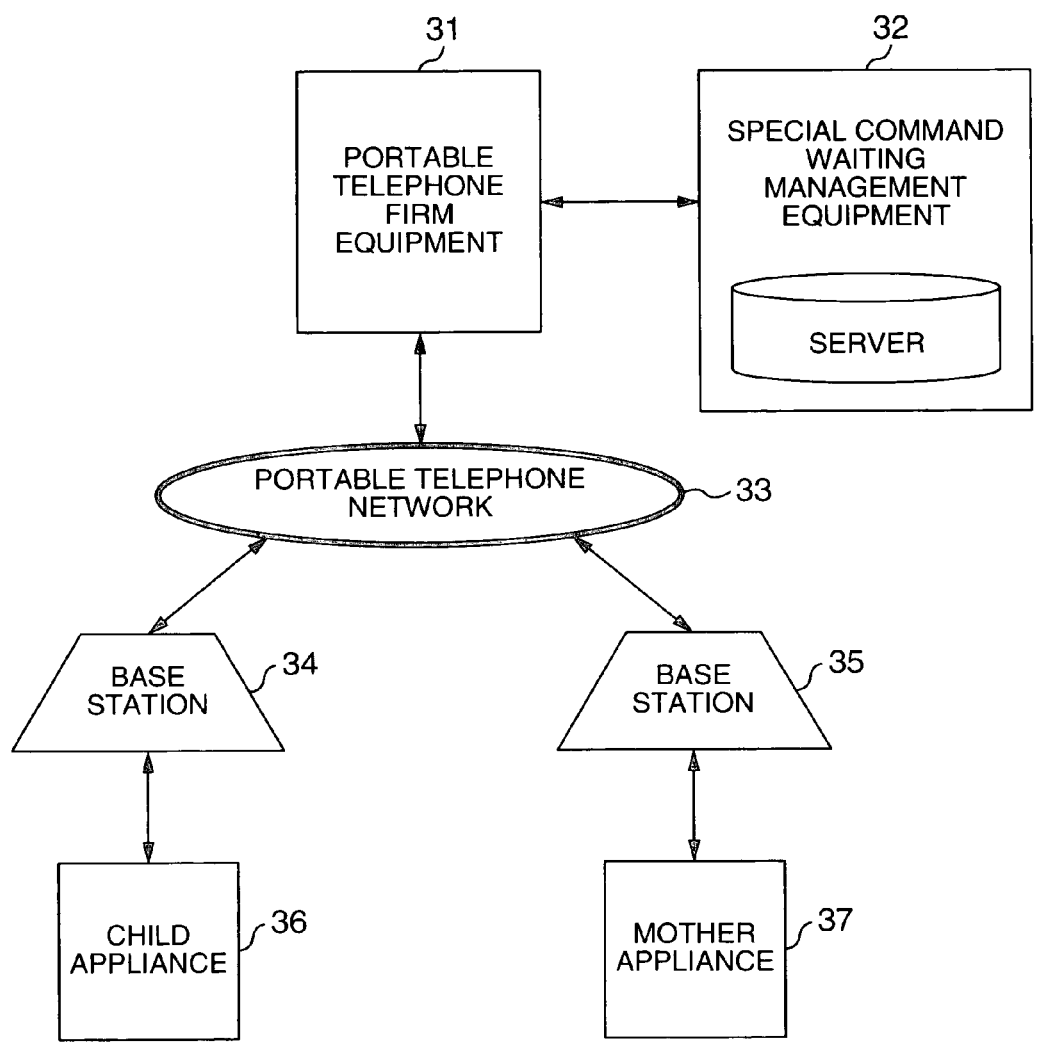
FIG. 3 illustratively shows a remote place communication system which utilizes a portable telephone network according to an embodiment of the present invention.

FIG. 3 illustratively represents a remote place communication system which utilizes a portable telephone network according to an embodiment of the present invention. The remote place communication system contains as structural elements, a portable telephone company equipment 31, a special command waiting management equipment 32, a portable telephone network 33, a base station 34, another base station 35, a child appliance 36, and a mother appliance 37.

Figure 4:
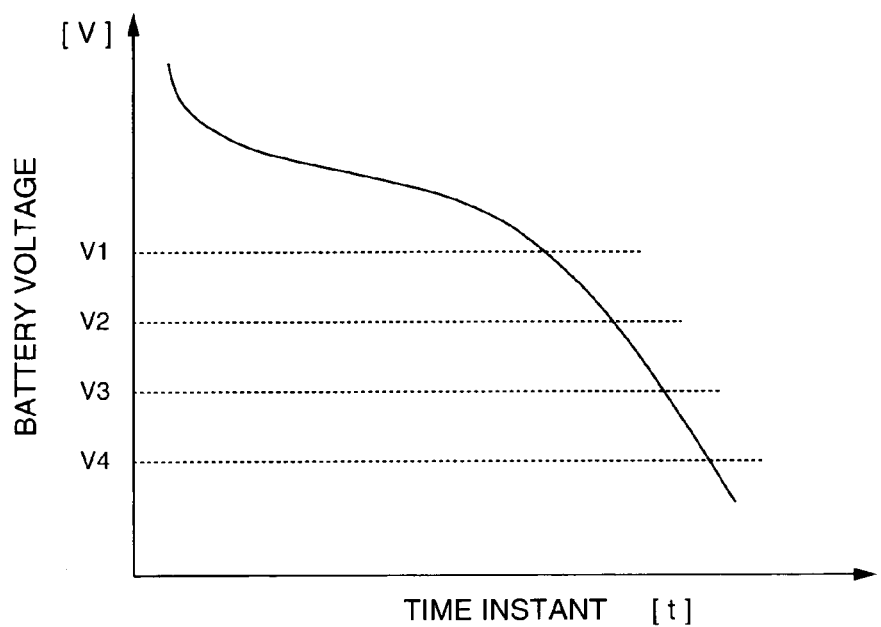
FIG. 4 represents an example of a battery characteristic diagram of the child appliance.
Figure 5:
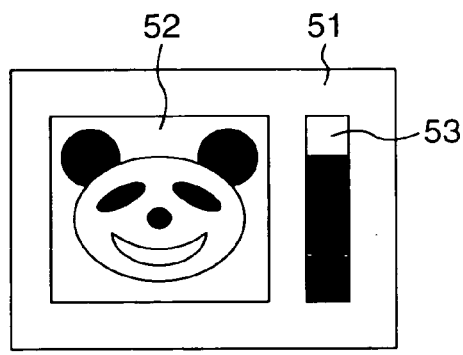
FIG. 5 is an example of an outer view of the child appliance according to an embodiment of the present invention.
Figure 6:
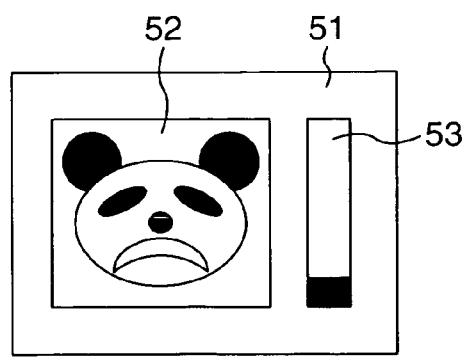
FIG. 6 is another example of the outer view of the child appliance according to an embodiment of the present invention.

FIG. 4 shows an example of a battery characteristic diagram of the child appliance. FIG. 5 represents an example of an outer view of the child appliance, and FIG. 6 shows another example of the outer view of the child appliance.

An operation of the present invention will now be described.

As shown in FIG. 4, while a time instant "t" is increased, a remaining power amount of the battery installed in the child appliance is lowered, and thus, a voltage of the battery is lowered. Voltages V1, V2, V3 and V4 have been set to the following relationship.

$$V1 \geq V2 \geq V3 \geq 4$$

In the child appliance 11 shown in FIG. 1, an output of the battery 16 is entered via an analog-to-digital converter (will be referred to as "converter" hereinafter) of the microcomputer 19, so that a voltage value of the battery 16 can be determined by the microcomputer 19.

When the voltage value of the battery 16 is lowered and then is reached to the voltage V1, the remaining battery power amount display unit 18 displays that the remaining battery power amount is low under control of the microcomputer 19.

Examples of display outer appearances at this time are shown in FIG. 5 and FIG. 6. FIG. 5 shows an example in the case that the remaining battery power amount is high. A display unit 51 which is equivalent to the remaining battery power amount display unit 18 of FIG. 1 is constituted by a character image display unit 52 and a bar display unit 53. FIG. 5 indicates such an example that a remaining battery power amount is high. A character of the character image display unit 52 is displayed as a smiling face indicative of a full stomach condition, so that this character may become effective as a display unit which may be easily recognized by children and elder persons. Conversely, FIG. 6 shows an example in such a case that a remaining battery power amount is low, and a character of the character image display unit 52 displays a sad face indicative of a hunger. Alternatively, although not shown in the drawings, a speaker may be mounted, and when the remaining battery power amount is high, the speaker may produce language voice indicative of such a full stomach condition as "I'm a full stomach", whereas when the remaining battery power amount is low, the speaker may produce language voice representative of such a hungry condition as "I'm hungry." The alternative unit may become effective as an easily understandable display unit.

When the battery voltage value is further lowered to be reached to another voltage V2, information is transmitted via the transmitting/receiving unit 14 to the mother appliance 21 of FIG. 2 under control of the microcomputer 19.

In the mother appliance 21, the information received by the transmitting/receiving unit 23 is acquired by the microcomputer 28, and then, when the microcomputer 28 recognizes a shortage of the remaining battery power amount as to the child appliance 11, the mother appliance 21 immediately displays such a fact that the remaining battery power amount of the child appliance 11 is low on the remaining battery power amount display unit 27 under control of the microcomputer 28.

When the battery recharging operation of the child appliance 11 can be quickly carried out between the voltage V1 and the voltage V2, then no information is transmitted to the mother appliance 21 from the child appliance 11. However, when the battery recharging operation of the child appliance 11 cannot be quickly carried out between the voltage V1 and the voltage V2, then the information is transmitted to the mother appliance 21 from the child appliance 11.

Furthermore, when the battery voltage value of the child appliance 11 is lowered to the voltage V3, a limitation is made to the operation of the child appliance 11 under control of the microcomputer 19 in such a manner that an instruction which does not require urgency is refused, and the child appliance 11 is brought into a special command accepting condition, so that consumption of the electric power of the child appliance 11 may be suppressed. Under the special command waiting condition, the child appliance 11 receives only previously registered special commands such as a positional information communication made by an urgent search instruction.

When the battery voltage value of the child appliance 11 is furthermore lowered and is then reached to the voltage V4, the child appliance 11 is brought into such a condition that there is a risk that the operation of the child appliance 11 fails, for example, electric power required to execute a position retrieving operation and an information transmitting operation cannot be guaranteed. As a consequence, the microcomputer 19 stores a content of a special command into the non-volatile memory 110, and then executes such an operation in accordance with the stored special command after the electric power condition of the child appliance 11 has been recovered to such an electric power condition which is required to execute the position retrieving operation and the information transmitting operation.

Alternatively, under such an environmental condition that a communication system is constructed which contains the accommodation having such a server as the special command waiting management equipment 32 of FIG. 3, commands issued from the mother appliance 37 may be continuously and temporarily stored in the above-described server, and at such a time when the child appliance 36 executes a content of a command, the corresponding command which has stored in the server may be deleted therefrom, so that contents of the commands which have not yet been executed may be held on the server. In the alternative case, even after the battery voltage value of the child appliance 36 has been lowered and reached to the voltage V4, the operation condition of the child appliance 36 is recovered to such an electric power condition which requires to execute a position retrieving operation and an information transmitting operation, and subsequently, the child appliance 36 may receive the content of the command which has been held on the server and has not yet been executed, and may execute the received command.

Also, in the child appliance 11 of FIG. 1, as one example of the power generating unit 17, a solar cell may be conceived. Also, an another example of the power generating unit 17, such a structure may be conceived in which vibration energy is gradually stored, and the vibration energy is obtained from a vibration detector used in a so-called "MANPPO KEI" (Registered Trademark). Since the power generating unit 17 using these power generating structures is combined with the child appliance 11, after the battery voltage value of the child appliance 11 is lowered and reached to the voltage V4, even under such a condition that the user of the child appliance 11 cannot perform the recharging operation, the child appliance 11 can be automatically recovered to such a battery voltage condition which is required to execute the position retrieving operation and the information transmitting operation, and then, the child appliance 11 can execute the content of the above-described command which has not yet been performed after the battery voltage has been recovered.

As previously described, in accordance with the present invention, for example, even when a child owns the child appliance for a crime prevention purpose, a mother who corresponds to a managing person can recognize lowering of the remaining battery power amount of the child appliance. As a result, the managing responsibility as to the remaining battery power amount of the child appliance is not given only to this child, but also, the reliability as to the crime preventing appliance can be improved. Also, even when the remaining battery power amount of the child appliance is lowered, the power saving operation can be carried out in such a manner that the operation of the child appliance is limited only to the previously-registered special command, for example, the position is communicated in response to the urgent searching instruction. Moreover, while the special command is stored in either the non-volatile memory employed in the child appliance or the server of the management facility, since the child appliance can respond after the remaining battery power amount, the special command can be firmly carried out, and thus, the reliability as the crime preventing appliance can be improved.

Also, since the power generating unit is provided in the child appliance, the remaining battery power amount can be recovered even in the automatic mode, so that the specific command can be firmly carried out, and thus, the reliability as the crime preventing appliance can be improved.

In accordance with the present invention, the information transmission system having the higher reliability and the information transmission apparatus having the higher reliability can be provided.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information transmission system comprising:
a first information transmission apparatus comprising a first battery, a first remaining battery power amount detector, a first transmitter/receiver, and a first display; and
a second information transmission apparatus comprising a second transmitter/receiver and a second display; wherein:
when a remaining battery power amount of the first information transmission apparatus is decreased to be lower than or equal to a first threshold value, the first display displays information indicating that the remaining battery power amount is low;
when a remaining battery power amount of the first information transmission apparatus is decreased to be lower than or equal to a second threshold value, the first information transmission apparatus transmits remaining battery power information of the first information transmission apparatus to the second information transmission apparatus, and the second display displays the remaining battery power information of the first information transmission apparatus; and
wherein the first threshold value is larger than the second threshold value; and wherein:
when a remaining battery power amount of said first information transmission apparatus is decreased to be lower than or equal to a third threshold value, said first information transmission apparatus is controlled to respond only a command having a higher significant degree within commands transmitted from said second information transmission apparatus to said first information transmission apparatus.

2. An information transmission system comprising:
a first information transmission apparatus comprising a first battery, a first remaining battery power amount detector, a first transmitter/receiver, and a first display; and
a second information transmission apparatus comprising a second transmitter/receiver and a second display; wherein:
when a remaining battery power amount of the first information transmission apparatus is decreased to be lower than or equal to a first threshold value, the first display displays information indicating that the remaining battery power amount is low;
when a remaining battery power amount of the first information transmission apparatus is decreased to be lower than or equal to a second threshold value, the first information transmission apparatus transmits remaining battery power information of the first information transmission apparatus to the second information transmission apparatus, and the second display displays the remaining battery power information of the first information transmission apparatus; and
wherein the first threshold value is larger than the second threshold value; and wherein:
said first information transmission apparatus further includes a non-volatile memory, and
when a remaining battery power amount of said first information transmission apparatus is decreased to be lower than or equal to a fourth threshold value, only a command having a higher significant degree within commands transmitted from said second information transmission apparatus to said first information transmission apparatus being stored into the non-volatile memory.

3. An information transmission system comprising:
a first information transmission apparatus comprising a first battery, a first remaining battery power amount detector, a first transmitter/receiver, and a first display; and
a second information transmission apparatus comprising a second transmitter/receiver and a second display; wherein:
when a remaining battery power amount of the first information transmission apparatus is decreased to be lower than or equal to a first threshold value, the first display displays information indicating that the remaining battery power amount is low;
when a remaining battery power amount of the first information transmission apparatus is decreased to be lower than or equal to a second threshold value the first information transmission apparatus transmits remaining battery power information of the first information transmission apparatus to the second information transmission apparatus, and the second display displays the remaining battery power information of the first information transmission apparatus; and
wherein the first threshold value is larger than the second threshold value; and wherein:
said information transmission system further comprises:
a management server for managing both a command and an execution condition which are transmitted and received between said first information transmission apparatus and said second information transmission apparatus, said management server managing both a command which is transmitted from said second information transmission apparatus to said first information transmission apparatus and a command execution condition of said first information transmission apparatus, and an unexecuted command being stored into said management server, which is instructed from said second information transmission apparatus to be brought into an unexecuted condition by said first information transmission apparatus.

4. An information transmission system as claimed in claim 3 wherein:
a transmission of the unexecuted command from said management server to said first information transmission apparatus is realized by way of an automatic transmitting manner that the transmission of the unexecuted command is carried out every time either a predetermined time interval has passed or a predetermined time instant has elapsed.

5. An information transmission system as claimed in claim 3 wherein:
the unexecuted command is transmitted from said management server to said first information transmission apparatus in response to an unexecuted command transmitting request issued from said first information transmission apparatus.

6. An information transmission system as claimed in claim 5 wherein:
in a case that said first remaining battery power amount is increased higher than or equal to a fifth threshold value, an unexecuted command transmitting request is transmitted from said first information transmission apparatus to said management server.

* * * * *